US008606815B2

(12) United States Patent
Chen et al.

(10) Patent No.: US 8,606,815 B2
(45) Date of Patent: Dec. 10, 2013

(54) SYSTEMS AND METHODS FOR ANALYZING ELECTRONIC TEXT

(75) Inventors: Ying Chen, San Jose, CA (US); Larry Proctor, Coppell, TX (US); William Scott Spangler, San Martin, CA (US)

(73) Assignee: International Business Machines Corporation, Armonk, NY (US)

( * ) Notice: Subject to any disclaimer, the term of this patent is extended or adjusted under 35 U.S.C. 154(b) by 618 days.

(21) Appl. No.: 12/331,271

(22) Filed: Dec. 9, 2008

(65) Prior Publication Data

US 2010/0145940 A1    Jun. 10, 2010

(51) Int. Cl.
*G06F 7/00*    (2006.01)
*G06F 17/30*    (2006.01)

(52) U.S. Cl.
USPC .......................................... 707/777; 707/737

(58) Field of Classification Search
None
See application file for complete search history.

(56) References Cited

U.S. PATENT DOCUMENTS

| | | | |
|---|---|---|---|
| 6,952,700 B2 | 10/2005 | Modha et al. | |
| 7,043,433 B2 | 5/2006 | Hejna, Jr. | |
| 7,523,085 B2 | 4/2009 | Nigam et al. | |
| 7,689,557 B2* | 3/2010 | Pandit et al. | 707/771 |
| 7,720,835 B2 | 5/2010 | Ward et al. | |
| 7,774,360 B2* | 8/2010 | Sun et al. | 707/776 |
| 8,417,713 B1* | 4/2013 | Blair-Goldensohn et al. | 707/751 |
| 2003/0046080 A1 | 3/2003 | Hejna, Jr. | |
| 2003/0115188 A1* | 6/2003 | Srinivasa et al. | 707/3 |
| 2003/0182123 A1* | 9/2003 | Mitsuyoshi | 704/270 |
| 2005/0086592 A1* | 4/2005 | Polanyi et al. | 715/512 |
| 2005/0091038 A1* | 4/2005 | Yi et al. | 704/10 |
| 2005/0165819 A1* | 7/2005 | Kudoh et al. | 707/101 |
| 2005/0203900 A1* | 9/2005 | Nakamura et al. | 707/5 |
| 2005/0283680 A1* | 12/2005 | Kobayashi et al. | 714/39 |
| 2006/0069589 A1* | 3/2006 | Nigam et al. | 705/1 |
| 2006/0200342 A1* | 9/2006 | Corston-Oliver et al. | 704/10 |
| 2006/0235843 A1 | 10/2006 | Musgrove et al. | |
| 2006/0242190 A1* | 10/2006 | Wnek | 707/102 |
| 2007/0016580 A1* | 1/2007 | Mann et al. | 707/6 |

(Continued)

FOREIGN PATENT DOCUMENTS

EP    1 818 839 A1    8/2007

OTHER PUBLICATIONS

W. S. Spangler J. T. KreulenJ. F. Newswanger "Machines in the conversation: Detecting themes and trends in informal communication streams" IBM Systems Journal, vol. 45, No. 4, 2006.*

(Continued)

*Primary Examiner* — Polina Peach
(74) *Attorney, Agent, or Firm* — Cantor Colburn LLP

(57) ABSTRACT

Systems and methods for systematically analyzing an electronic text are described. In one embodiment, the method includes receiving the electronic text from a plurality of sources. The method also includes determining an at least one term of interest to be identified in the electronic text. The method further includes identifying a plurality of locations within the electronic text including the at least one term of interest. The method also includes for each location within a plurality of locations, creating a snippet from a text segment around the at least one term of interest at the location within the electronic text. The method further includes creating multiple taxonomies for the at least one term of interest from the snippets, wherein the taxonomies include an at least one category. The method also includes determining co-occurrences between the multiple taxonomies to determine associations between categories of a different taxonomies of the multiple taxonomies.

16 Claims, 9 Drawing Sheets

(56) References Cited

U.S. PATENT DOCUMENTS

| | | | |
|---|---|---|---|
| 2007/0033221 A1* | 2/2007 | Copperman et al. | 707/103 R |
| 2007/0073745 A1* | 3/2007 | Scott et al. | 707/100 |
| 2007/0073758 A1 | 3/2007 | Perry et al. | |
| 2007/0094600 A1* | 4/2007 | Sullivan et al. | 715/711 |
| 2007/0208569 A1* | 9/2007 | Subramanian et al. | 704/270 |
| 2007/0294230 A1 | 12/2007 | Sinel et al. | |
| 2007/0294281 A1 | 12/2007 | Ward et al. | |
| 2008/0114755 A1 | 5/2008 | Wolters et al. | |
| 2008/0195567 A1 | 8/2008 | Chen et al. | |
| 2008/0215607 A1 | 9/2008 | Kaushansky et al. | |

OTHER PUBLICATIONS

Mete Celik Shashi Shekhar James P. Rogers James A. Shine Jin Soung Yoo "Mixed-Drove Spatio-Temporal Co-occurrence Pattern Mining: A Summary of Results", 2006, IEEE.*

S. Spangler et al., "COBRA—Mining Web for COrporate Brand and Reputation Analysis", Proc. of IEEE/WIC/ACM International Conference on Web Intelligence, 2007, pp. 11-17.

D. Modha et al., "Feature Weighting in K-Means Clustering", Machine Learning, vol. 52, No. 3, 2003, pp. 217-237.

S. Spangler et al., "Generating and Browsing Multiple Taxonomies Over a Document Collection", Journal of Management Information Systems, vol. 19, No. 4, 2003, pp. 191-212.

R. Srikant et al., "Mining Association Rules with Item Constraints", Proc. of 3rd Int'l Conf. on Knowledge Discovery in Databases and Data Mining, Aug. 1997, Newport Beach, CA., pp. 67-73.

S. Spangler et al., "MindMap: Utilizing Multiple Taxonomies and Visualization to Understand a Document Collection", Proceedings of the 35th Hawaii Int'l. Conference on System Sciences, (HICSS-35'02), pp. 1170-1179.

S. Spangler et al., "Machines in the conversation: Detecting themes and trends in informal communication streams", IBM Systems Journal, vol. 45, No. 4, 2006, p. 785.

S. Spangler et al., "Multi-Taxonomy: Determining Perceived Brand Characteristics from Web Data", Proc. of WI-IAT '08, IEEE/WIC/ACM International Conf. on Web Intelligence and Intelligent Agent Technology, 2008, pp. 258-264.

International Search Report and written opinion dated May 6, 2010, for International Appl. No. PCT/EP2009/066222.

Robert J. Bayardo et al., "Mining the Most Interesting Rules", Proc. of the Fifth ACM SIGKDD Int'l. Conf. on Knowledge Discovery and Data Mining, 1999, pp. 145-154.

Amit Behal et al., "Business Insights Workbench—An Interactive Insights Discovery Solution", Proc. of the 12th Int'l Conf. on Human-Computer Interaction, 2007, pp. 834-843.

IBM, Ascential. Available at http://www.ibm.ascential.com, 5 Pages as printed from the web Oct. 7, 2010.

IBM, DB2 Data Warehouse Edition. Available at http://www-306.ibm.com/software/data/db2/dwe, 3 pages as printed from the web on Oct. 8, 2010.

Kalido, Enterprise Data Warehousing. Available at http://kalido.com, 2 pages as printed from the web on Nov. 3, 2010.

Lucene. Available at http://lucene.apache.org, 9 pages as printed from the web on Oct. 8, 2010.

Bin He et al., "BIwTL: A Business Information Warehouse Toolkit and Language for Warehousing Simplification and Automation", Proc. of the ACM SIGMOD '07, Jun. 11-14, 2007, Beijing, China, pp. 1041-1052.

Java Tutorials Essential Classes. Available at http://java.sun.com/docs/books/tutorial/essential/regex/, 2 pages printed from the web on Oct. 8, 2010.

J. Han et al., "Data Mining: Concept and Techniques", Publisher: Morgan Kaufman, Academic Press 2001. Chapter 2, Section 2.2.2. "Stars, Snowflakes, and Fact Constellations: Schemas for Multidimensional Databases", pp. 48-50, Section 2.2.3 "Examples for Defining Star, Snowflake, and Fact Constellation Schemas", pp. 52-53. Chapter 9, Mining Complex Types of Data, "Example 9.5-9.6", pp. 406-408.

E. Rich et al., "Artificial Intelligence, 2nd Edition", Publisher: McGraw-Hill Inc. 1991. Chapter 16, Section 16.3 "Distributed Reasoning Systems", pp. 433-444.

* cited by examiner

| Class | Size | marmite | promite | vegemite |
|---|---|---|---|---|
| negative | 11052 | ☐ 6430 (58... | ☐ 216 (1.95%) | ☐ 3703 (33... |
| neutral | 27342 | ☐ 16279 (59... | ☐ 562 (2.06%) | ☐ 8792 (32... |
| positive | 12799 | ☐ 7143 (55... | ☐ 128 (1.00%) | ☐ 4781 (37... |
| Total | 51193 | ☐ 29852 | ☐ 906 | ☐ 17276 |

| Term | Count | vegemite | marmite | promite | Ambiguo... |
|---|---|---|---|---|---|
| avocado | 203 | 143 (1.5792... | 43 (1.0) | 5 (0.452862... | 5 (1.0) |
| ban | 439 | 221 (1.5232... | 169 (1.0) | 1 (1.0) | 45 (8.42385... |
| biscuit | 479 | 258 (8.4034... | 187 (1.0) | 3 (1.0) | 20 (1.0) |
| breakfast | 1738 | 896 (0.0) | 759 (1.0) | 11 (1.0) | 40 (1.0) |
| butter | 3186 | 1364 (5.404... | 1599 (1.0) | 20 (1.0) | 168 (0.0063... |
| canada | 162 | 84 (1.05447... | 63 (1.0) | 1 (1.0) | 12 (0.05297... |
| carrot | 448 | 126 (1.0) | 300 (1.9113... | 1 (1.0) | 11 (1.0) |
| champagne | 187 | 22 (1.0) | 164 (3.1924... | 0 (1.0) | 0 (1.0) |
| cheese | 2943 | 1117 (6.610... | 1682 (1.0) | 23 (1.0) | 69 (1.0) |
| chicken | 791 | 291 (0.0682... | 447 (1.0) | 7 (1.0) | 26 (1.0) |
| coffee | 680 | 333 (2.8627... | 311 (1.0) | 2 (1.0) | 17 (1.0) |
| commercial | 108 | 64 (1.98729... | 41 (1.0) | 0 (1.0) | 1 (1.0) |
| cookies | 109 | 78 (6.38612... | 24 (1.0) | 1 (1.0) | 3 (1.0) |
| cracker | 91 | 56 (2.00238... | 29 (1.0) | 0 (1.0) | 6 (0.285914... |
| crisp | 621 | 48 (1.0) | 559 (0.0) | 0 (1.0) | 9 (1.0) |
| fruit | 813 | 391 (2.7639... | 352 (1.0) | 5 (1.0) | 17 (1.0) |
| hangover | 109 | 71 (3.96583... | 33 (1.0) | 1 (1.0) | 4 (1.0) |
| healthy | 245 | 110 (2.1543... | 118 (1.0) | 1 (1.0) | 11 (0.89630... |
| honey | 567 | 253 (3.6592... | 277 (1.0) | 5 (1.0) | 26 (0.75530... |
| illegal | 91 | 53 (7.57102... | 27 (1.0) | 0 (1.0) | 7 (0.113387... |

SYSTEMS AND METHODS FOR ANALYZING ELECTRONIC TEXT

FIELD OF THE INVENTION

Embodiments of the disclosure relate generally to the field of data processing. For example, embodiments of the disclosure relate to systems and methods for analyzing electronic text.

BACKGROUND

Most corporations consider a strong brand as a major asset to the corporation. Therefore, many corporations attempt to track public perception of their brand, including the company name and any product names. Brand image and reputation tracking is limited to news wires and contact centers analysis. With the emergence of the world wide web and Consumer Generated Media (CGM), including blogs, news forums, message boards, and web pages/sites, building of a brand perception has been rapidly transformed from traditional marketing campaigns to word of mouth via viral advertising and/or an accumulation of individual posts and comments regarding a brand.

Thus, analysis of brand reputation cannot accurately determine a brand's worth without a manual analysis of a plurality of individual perceptions found on the internet. Therefore, strategic decision making regarding advertising, marketing, and other brand related decisions are impaired by the inability to correctly determine a brand's perception by the public.

SUMMARY

Systems and methods for systematically analyzing an electronic text are described. In one embodiment, the method includes receiving the electronic text from a plurality of sources. The method also includes determining an at least one term of interest to be identified in the electronic text. The method further includes identifying a plurality of locations within the electronic text including the at least one term of interest. The method also includes for each location within a plurality of locations, creating a snippet from a text segment around the at least one term of interest at the location within the electronic text. The method further includes creating multiple taxonomies for the at least one term of interest from the snippets, wherein the taxonomies include an at least one category. The method also includes determining co-occurrences between the multiple taxonomies to determine associations between categories of a different taxonomies of the multiple taxonomies.

These illustrative embodiments are mentioned not to limit or define the invention, but to provide examples to aid understanding thereof. Illustrative embodiments are discussed in the Detailed Description, and further description of the disclosure is provided there. Advantages offered by various embodiments of this disclosure may be further understood by examining this specification.

BRIEF DESCRIPTION OF THE DRAWINGS

These and other features, aspects, and advantages of the present invention are better understood when the following Detailed Description is read with reference to the accompanying drawings, wherein:

FIG. 7 illustrates an example keywords category vs sentiment category cotable created by the summarization module of the system in FIG. 1.

FIG. 8 illustrates an example Dictionary to Category cotable created by the summarization module of the system in FIG. 1.

DETAILED DESCRIPTION OF PREFERRED EMBODIMENTS

Embodiments of the disclosure relate generally to the field of data processing systems. For example, embodiments of the disclosure relate to systems and methods for analyzing electronic text. Throughout the description, for the purposes of explanation, numerous specific details are set forth in order to provide a thorough understanding of the present disclosure. It will be apparent, however, to one skilled in the art that the present disclosure may be practiced without some of these specific details. In other instances, well-known structures and devices are shown in block diagram form to avoid obscuring the underlying principles of the present disclosure.

In one embodiment, the system implements an analytical method to discover key brand perception insights without any a priori knowledge. The system includes an embedded suite of analytics capabilities to allow brand and reputation analysis. The methods for analyzing electronic text include multiple methods for generating useful taxonomies from CGM content and methods to extract perceived brand characteristics. Such techniques may be specifically designed for mining blogs and web data with their inherent content quality issues, such as wrong spelling, grammar, etc. However, the techniques are easily adaptable to other better formed content sources, e.g., scientific articles and journals.

Creating Taxonomies

In one embodiment, the system extracts insights about a given brand from large corpus of web data. To understand large corpus of data, human beings often leverage different taxonomies. A taxonomy is a structure that groups similar elements of the unstructured information together in a "natural" way and categorized the large document set. Deriving insights from web data can therefore be reduced to the problem of creating groups of similar pieces of the web information together, i.e., multiple taxonomies, in a way that adds value.

In brand perception analysis, correct taxonomies that will help better understand the customer perception of the brand need to be determined and created. In one embodiment, four taxonomies, each with its own specific generation techniques, are effective at uncovering useful brand perception knowledge from web information. The four taxonomies include: Text Cluster based taxonomies; time based taxonomies; keyword taxonomies; and sentiment taxonomies. No single taxonomy or the method of generating it alone is sufficient for understand brand perceptions, in and of itself, but the combination of these methods together creates a powerful template for gaining brand insights from web data in a robust and repeatable fashion. The four taxonomies are described in detail below.

Figure 1:
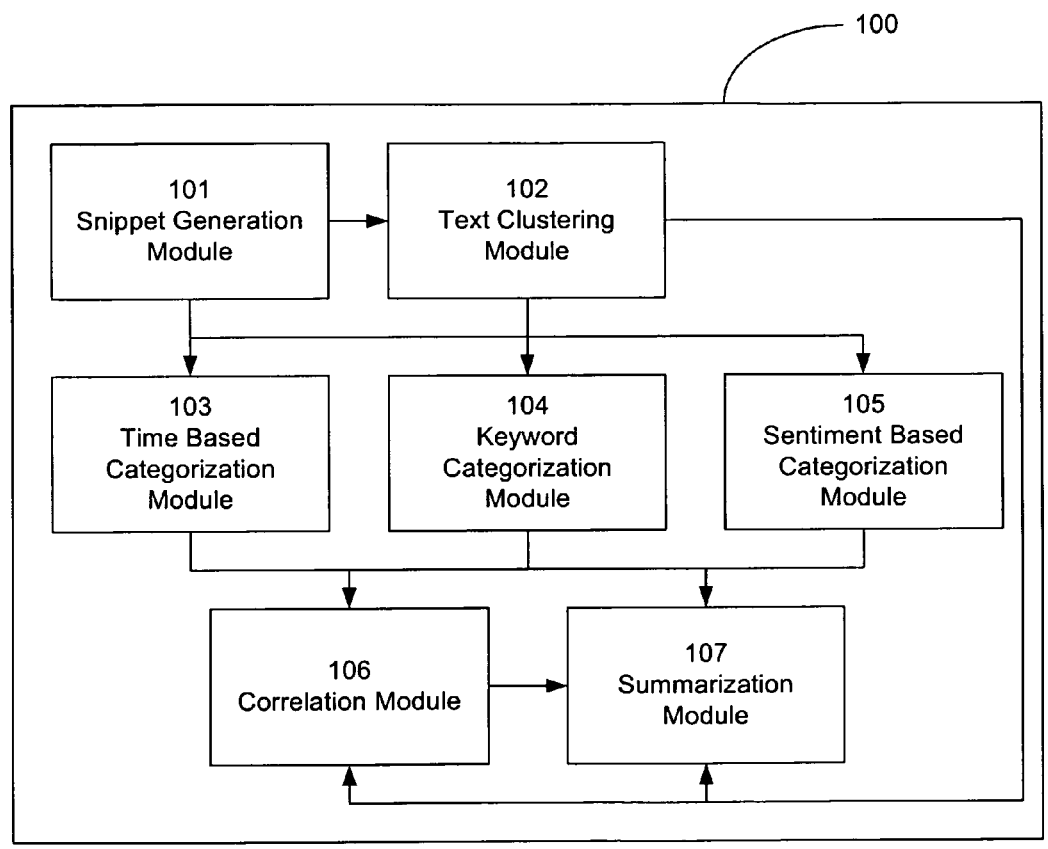
FIG. 1 illustrates a system for generating and summarizing taxonomies in analyzing electronic text.

FIG. 1 illustrates a system 100 for generating and summarizing taxonomies in analyzing electronic text. The system 100 generally comprises a snippet generation module 101, a text clustering module 102, a time based categorization module 103, a keyword categorization module 104, a sentiment based categorization module 105, a correlation module 106, and a summarization module 107.

The snippet generation module 101 of the system 100 creates snippets or portions of electronic text for analysis. One form of electronic text, web content, often is noisy. It may cover diverse topics in one document, even though only a few sentences might be relevant to the analysis subject. To more precisely analyze the text in the context of business objectives, snippets of electronic text are generated from ingested web data. A snippet is defined as a small text segment around a specified keyword. In one embodiment, the text segment is determined by sentence boundaries. In other embodiments, the text segment may be determined by number of words, number of characters, or number of sentences. For example, the snippet may include the sentence before, after, and comprising a term of interest. A term of interest is defined as a term discerning a focused topic and/or brand/company names. In general, snippets are built around the terms of interest. The disclosure describes converting documents into snippets, but any electronic text may be converted, including web pages, blogs or forum postings.

Text Clustering Based Taxonomy

The text clustering module 102 of the system 100 creates clusters of documents/electronic text for analysis. In one embodiment, the user may have no preconceived idea about what categories the document collection should contain, but in other embodiments, the user may start the system with a preliminary grouping of categories. Thus, text clustering is able to create an initial breakdown of the documents into clusters, by grouping together documents having similar word content.

To facilitate text clustering, documents may be represented in a vector space model. In one embodiment, each document is represented as a vector of weighted frequencies of the document features. Example document features include words, phrases, and strings of characters. In creating the vectors, the text clustering module 102 uses normalized term frequency (t×n) weighting scheme, which emphasizes words with high frequency in a document, to normalize each document vector to have a unit Euclidean norm (i.e., the magnitude of each vector is 1).

For example, in creating a document vector, if a document exclusively included the sentence, "We have no bananas, we have no bananas today," and a term dictionary consisted of only two terms, "bananas" and "today", then the unnormalized document vector would be [2,1] (which indicates two "bananas" and one "today"). The normalized version of the vector would be [2/√(2^2+1^2), 1/√(2^2+1^2)], which equals [2/√5, 1/√5].

Figure 2:
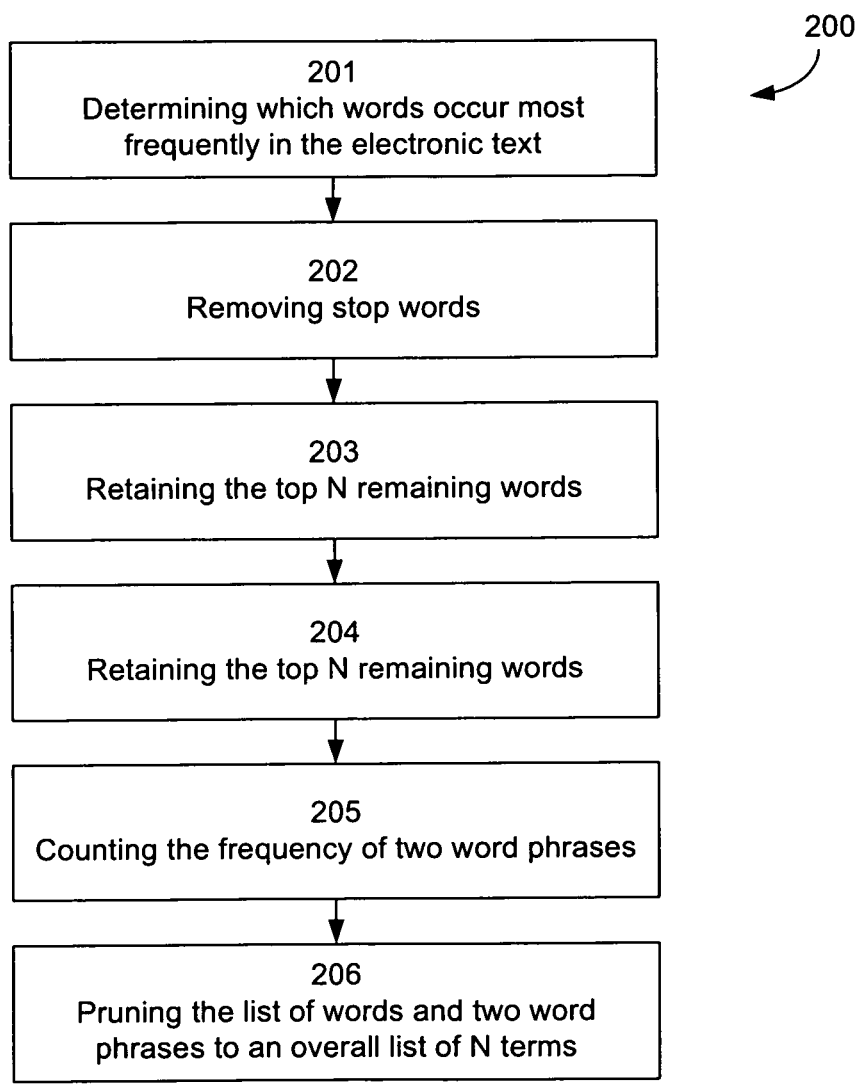
FIG. 2 illustrates an example method for creating a feature space (dictionary) for the documents by the text clustering module of the system in FIG. 1.

FIG. 2 illustrates an example method 200 for creating a feature space (dictionary) for the documents by the text clustering module 102. Beginning at 201, the module 102 determines which words and phrases make up the document feature space by counting which words occur most frequently in the text. In one embodiment, a word occurs most frequently in the text if it appears in the most documents making up the electronic text. Proceeding to 202, the module 102 removes common words that are not of interest. In one embodiment, the module 102 uses a standard "stop word" list to eliminate common words such as "an", "a", "and", "but", and "the."

Proceeding to 203, the module 102 retains the top N words remaining after removing the stop words. In one embodiment, the value of N may vary depending on the length of the documents, the number of documents and/or the number of categories to be created. In another embodiment, N may be designated by the user or a static amount stored by the system. As an example where the value of N may vary, N=2000 may be sufficient for 10000 short documents of about 200 words to be divided into 30 categories.

Proceeding to 204, the module 102 reviews the electronic text in a second pass that counts the frequency of the two word phrases that occur using the top N words from 203. In one embodiment, a two word phrase is defined as two consecutive words having no intervening words that are not stop words. In another embodiment, the module 102 searches for phrases consisting of more than two words. Proceeding to 205, the module 102 then prunes the overall list of N frequent words and the two word phrases found in 204 in order to keep the N most frequent words and phrases. The N most frequent words and phrases are the feature space (dictionary) of the document corpus. In one embodiment, the user may edit this feature space (dictionary) as desired to improve clustering performance, such as adding words and phrases the user deems important. Furthermore, the module 102 incorporates stemming to create a default synonym table that the user may edit.

Figure 3:
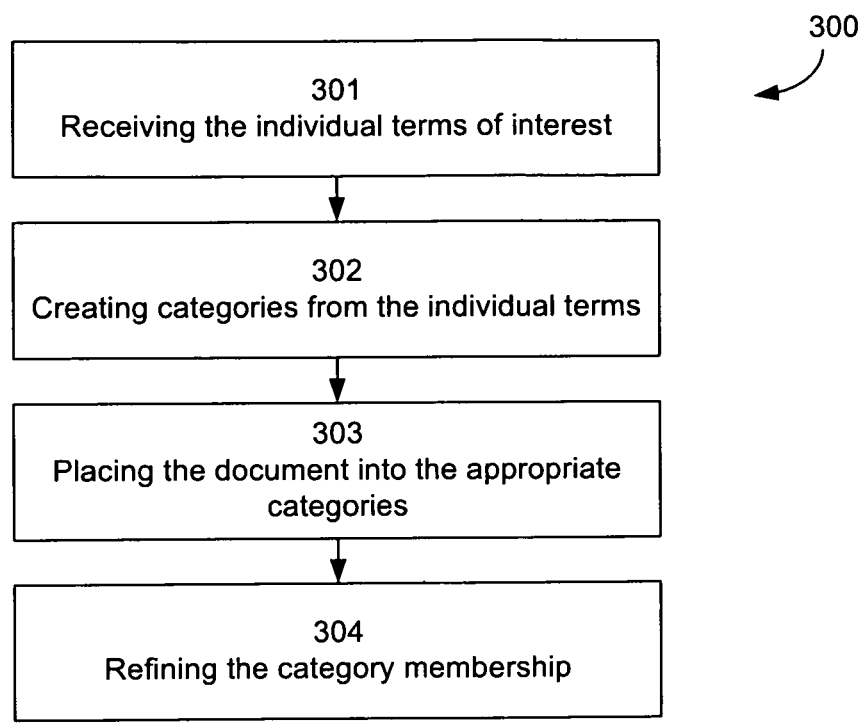
FIG. 3 illustrates an example method for indexing documents into categories by the text clustering module of the system in FIG. 1.

Upon creating a feature space (dictionary), the module 102 indexes the documents by their feature occurrences (i.e., word counts) to create the document vectors. FIG. 3 illustrates an example method 300 for indexing documents into categories by the text clustering module 102. In one embodiment, the system 100 implements a document categorization strategy based on categories centered on selected individual terms in the dictionary (keyword taxonomy, as described below). Thus, beginning at 301, the module 102 receives the individual terms of interest. Proceeding to 302, the module 102 creates categories from the selected individual terms. Terms of interest may not be known by a user beforehand. Therefore, in one embodiment, the module 102 determines the terms of interest by ranking all discovered terms in the data set based on a normalized measure of cohesion calculated using the formula in equation 1:

$$\text{cohesion}(T, n) = \frac{\sum_{x \in T} \cos(\text{centroid}(T), x)}{|T|^n} \quad (1)$$

wherein T is the set of documents that contain a given term, centroid(T) is the average vector of all these documents, and n is a parameter used to adjust for variance in category size. In one embodiment, n typically equals 0.9.

The cosine distance between document vectors X and Y is defined in equation 2:

$$\cos(X, Y) = \frac{X \cdot Y}{\|X\| \cdot \|Y\|} \quad (2)$$

Terms that score relatively high from equation 2 tend to be those with a significant number of examples having many common words. Adjusting n downward tends to surface more general terms with larger matching sets, while adjusting it upward gives more specific terms.

Proceeding to 303, the module 102 places the documents into each appropriate category. Upon ranking the terms, in one embodiment, the module 102 selects enough of the most cohesive terms to get 80-90% of the data categorized. Terms may be selected in cohesive order, skipping those terms in the list that do not add a significant number of additional examples (e.g. more than three) to those already categorized with previous terms. In one embodiment, the system 100 halts selection when at least 80% of the data has been categorized and the uncategorized examples are placed in a "Miscellaneous" category.

The module 102 then employs a single iteration of k-means to the documents within the generated categories to refine the category membership in 304 (i.e. each document is placed in the category of the nearest centroid as calculated by the term membership just described). Hence, each document that contains more than one of the selected terms is placed in the category that is best suited for the overall term content of the document. In one embodiment, the created clusters are named using the single term that was used to create the cluster, thus avoiding a complex name problem.

Such a text clustering based taxonomy represents a "table of contents" of the web data around a particular brand or set of brands. It allows the analyst to understand the full spectrum of key words or phrases used that are most commonly used by customers (or the public at large) when discussing the brand.

Alternative or in addition to the text clustering taxonomy, the system 100 may create a time based taxonomy using the time based categorization module 103, a keyword taxonomy using the keyword categorization module 104, and/or a sentiment based taxonomy using the sentiment based categorization module 105, as described below.

Time Based Taxonomies

Figure 4:
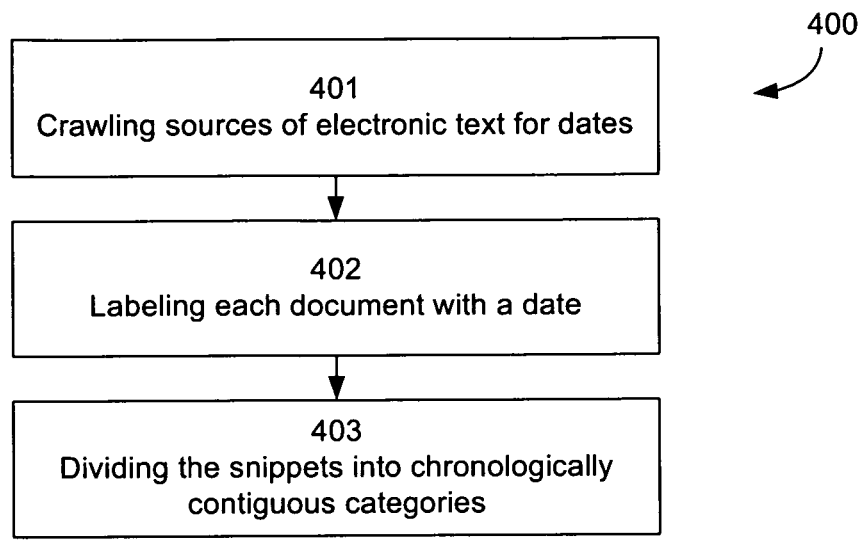
FIG. 4 illustrates an example method for the time based categorization module of the system in FIG. 1 to create a time based taxonomy.

Time based taxonomies are classifications of the documents into "chronologically contiguous" categories using the document creation date. FIG. 4 illustrates an example method 400 for the time based categorization module 103 of the system 100 to create a time based taxonomy. Beginning at 401, sites of interest, which may include, but is not limited to, blogs, message boards and news feeds, are crawled periodically by the module 103. The module 103 may then label each document with a date in 402. Proceeding to 403, the module 103 then divides the snippets created by the module 101 from various documents for a given topic into chronologically contiguous categories, wherein the snippets are associated with the date of the document including the snippet. Multiple methods exist for generating time based taxonomies, as described below.

Partitions Based on a Calendar

Partitions of data based on a calendar may use artificial demarcations including, but not limited to a day, a week, a month and/or a year. The appropriate granularity of the partition depends on the span of data being analyzed. In one embodiment, 10-30 categories are sufficient. Therefore, for a year's worth of data, partitions may be by the month. For data spanning a month, the data may be partitioned by days. Calendar based partitions may be useful for drawing trends by a user because the data is easily digestible. Interesting events, though, may span multiple categories and the data may tend to "clump" (be heavily skewed) into one or more categories.

Partitions Based on Sample Size

To eliminate data clumping, the module 103 may create equal size categories. In one embodiment, the module 103 targets a predefined number of categories for indexing the data. The number of categories may be independent of the data. In an example, if the number of categories is ten, the module 103 sorts the data chronologically and splits it up into ten approximately equal size categories, each having data that is relatively coincident in time. Sample Size based partitions may allow spotting of emerging (or declining) topics over time. Each category, though, may span a different size time period, thus causing a tougher review for a user.

Partitions on Known Events

Particular events that happened in time are established and easily identified, including, but not limited to, product announcements, news events related to a company or brand, and/or conferences/trade shows. In one embodiment, the module 103 partitions the data into three primary categories: before, during, and after the event. Such an approach helps determine that the time based partition is related to something important in the data stream. Hence, a user is able to visualize and understand the partitions and data because there are only three classes.

Keyword Taxonomies

In one embodiment, one taxonomy may be based purely on keywords or terms. Hence, the keyword categorization module 104 may create a taxonomy from various keywords. One example of such a taxonomy is related brands or company names (e.g., brands and companies in a given industry or target similar consumer groups). Often these names are known a prior by a user. In other embodiments, the names may be discovered by perusing the dictionary of terms generated by module 102 or predefined.

In one embodiment, the number of categories in the Brand/Company name taxonomy is usually equal to the number of keywords plus two. The two additional categories are: (1) "Miscellaneous" to include snippets that do not mention any brand or company (if any); and (2) "Ambiguous" to include snippets that mention more than one brand/company names. An "Ambiguous" grouping allows determining when an event different from discussing a specific brand or company occurs (e.g., to indicate an industry wide issue as opposed to a company/brand specific issue).

In addition to Brand/Company taxonomies, other types of keyword taxonomies can be developed by the keyword categorization module 104 based on a users' domain interest. For example, a "hot-issue" based keyword taxonomy may be defined by the keyword categorization module 104 using major customer dissatisfaction keywords, including, but not limited to, slow response, careless service, etc., to create the partitions. Keyword taxonomies may capture nearly any issue of a priori importance to the customer, though the keywords themselves may need to be refined to match how the concepts may appear in the data. Occurrence of such "hot-issue" terms in the electronic text is important, regardless of its overall prevalence in the data.

Sentiment Based Taxonomies

Sentiment analysis is a technique to gain insight into how a brand or company is perceived. A sentiment taxonomy may be partitions of positive sentiment, neutral sentiment, and negative sentiment. In one embodiment, the sentiment categorization module 105 of the system 100 implements a statistical sentiment analysis approach to measure the relative sentiment on a positive/negative scale expressed by the words in each snippet. The module 105 then generates numeric scores and partitions the snippets into the positive/negative/neutral categories based on the scores.

Figure 5:
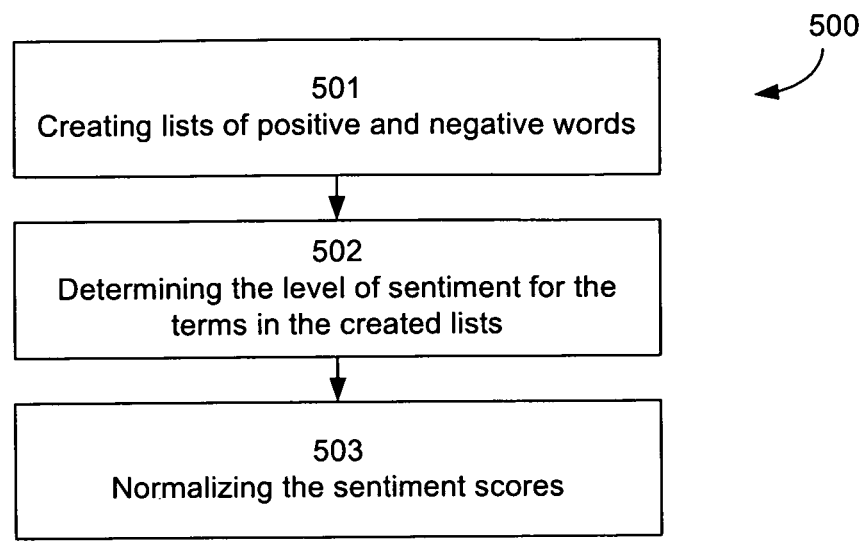
FIG. 5 illustrates an example method for the sentiment categorization module of the system in FIG. 1 to score terms in order to score and categorize snippets.

In order to score and partition snippets, sentiment scores are generated for the terms in the snippets. FIG. 5 illustrates an example method 500 for the sentiment categorization module 105 of the system 100 to score terms in order to score and categorize snippets. Beginning at 501, in one embodiment, the module 105 creates lists of positive and negative words using at least one external Natural Language Processing (NLP) resource. Two example NLP resources include (i) The Inquirer database and (ii) WordNet. In another embodiment, an internal dictionary may be used.

The Inquirer database contains more than 4,000 unique words, mostly adjectives. For each word, it defines approximately two hundred Boolean attributes. Some of these attributes are used to decide whether the word is used mostly in a positive sense or in a negative sense. WordNet is an online lexical reference system whose design is inspired by current psycholinguistic theories of human lexical memory. English nouns, verbs and adjectives are organized into synonym sets, each representing one underlying concept.

In one embodiment, the module 105 determines for each term in WordNet if most of the synonyms of a word are positive (or negative) according to the Inquirer and then marks the original term as positive (or negative). In one example, a baseline list of 1905 Positive words and 2282 Negative words was created, which may be used for sentiment scoring. The module 105 may receive previously determined results of positive and negative word lists when comparing the two NLP resources (e.g., the 1905 Positive words list and the 2282 Negative words list).

Upon establishing positive and negative sentiment words or terms in 501, the module 105 establishes the degree of sentiment for terms in 502. To measure the relative degree of sentiment between different snippets or documents that both use positive/negative words, in one embodiment, the module 105 characterizes the degree (amount) of positive/negative sentiment each sentiment word conveys by looking up the dictionary definition of the word in WordNet and determining a sentiment score for the word as the difference between the occurrence of positive sentiment words and negative sentiment words in the definition. In one embodiment, the occurrence of the word itself in its own definition is counted once if the word appears one or more times, where as other positive/negative words are counted for each occurrence. For further refinement, only adjective or noun definitions may be used and no other part of speech definitions are considered.

Proceeding to 503, the module 105 normalizes the sentiment scores by dividing the score by the total number of definitions. The score indicates the relative sentiment tones each individual word includes. For example, "wonderful" has a score of positive 13, because its one definition includes thirteen positive words. The word "amnesty" has a score of positive 1.25, because its four definitions include in total five positive words.

The same method for scoring negative/positive sentiment words in the original word lists can be used to score any word in the dictionary generated during text clustering. Each word may have both a positive and a negative impact based on having both positive and negative words in its definition. Thus, the dictionary terms may have less individual impact on the sentiment score than words in the original positive/negative word list. In one embodiment, words that are not defined in WordNet are ignored for sentiment analysis.

Figure 6:
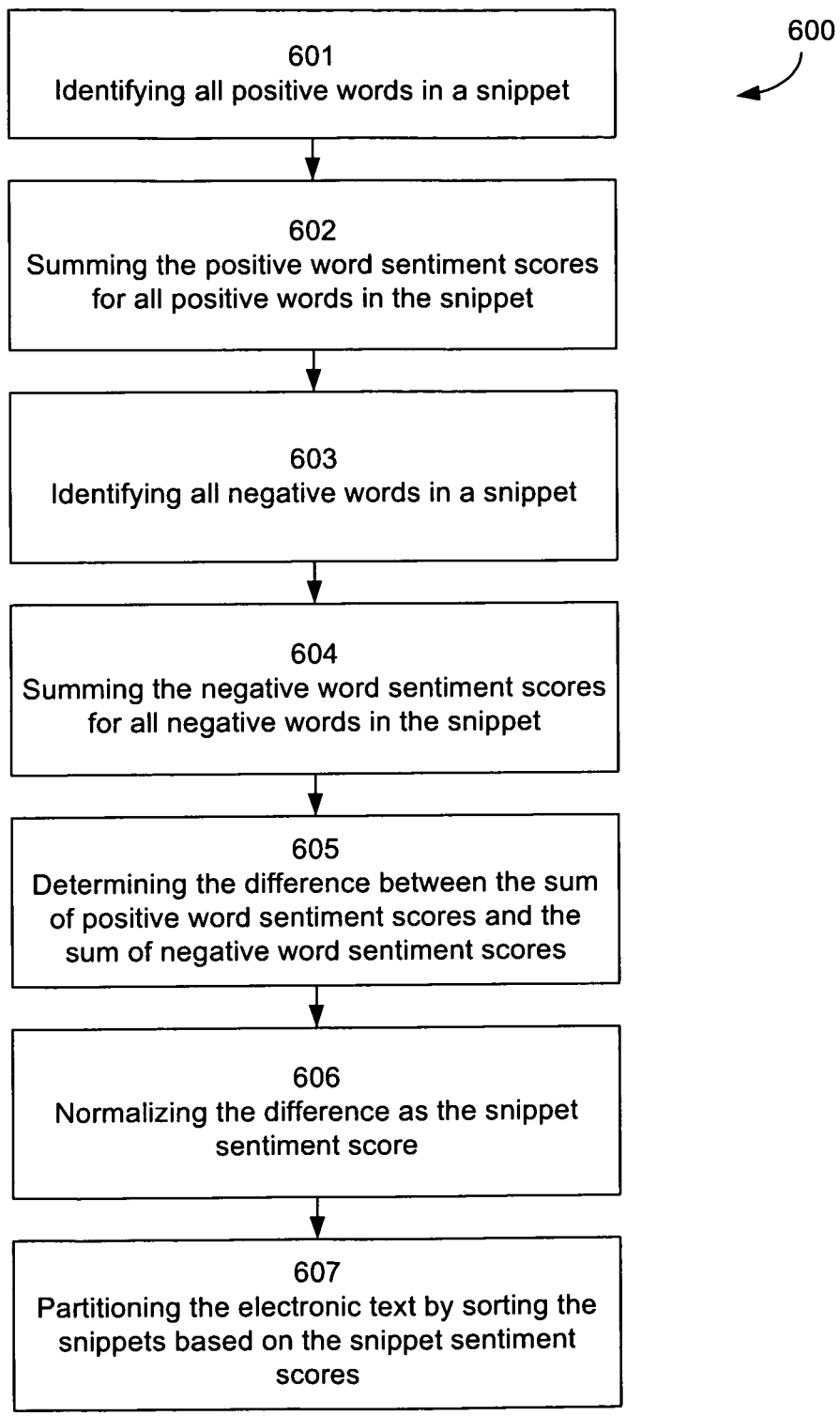
FIG. 6 illustrates an example method for the sentiment categorization module of the system in FIG. 1 to categorize snippets using the scored terms from the method in FIG. 5.

Upon the module 105 having access to sentiment scores for the terms or words in snippets, the module 105 may score and categorize the snippets for sentiment analysis. FIG. 6 illustrates an example method 600 for the sentiment categorization module 105 to categorize snippets using the scored words. Beginning at 601, the module 105 identifies all positive words in a snippet. Proceeding to 602, the module 105 then sums the positive word sentiment scores for all positive words in the snippet. In 603, the module 105 identifies all negative words in a snippet. Proceeding to 604, the module 105 then sums the negative word sentiment scores for all negative words in the snippet. The module 105 then determines the difference between the sum of positive scores and the sum of negative scores in 605 to create a sentiment score for the snippet. The score is then normalized in 606 by dividing by the square root of the snippet length.

Proceeding to 607, the module 105 then partitions the electronic text by sorting the snippets. In one embodiment, the module 105 may sort the snippets into quintiles based on the sentiment scores of the snippets. For example, the bottom quintile may include the snippets whose sentiment scores are within the lowest 20% of the sentiment scores for all of the snippets in the data. The module 105 determines the bottom quintile to be the negative class, the top quintile to be the positive class, and the three middle quintiles to be the neutral class. In another embodiment, the snippets are sorted into thirds, fourths, or any other portions predetermined by the user.

Employing Taxonomies

After the system 100 creates useful taxonomies, it must be understood what the categories in each taxonomy include. In one embodiment, the correlation module 106 of the system 100 determines correlations between categories in different taxonomies. For example, a keyword category may have significant overlap of documents or snippets with a time based category. The module 106 may also compare the feature space (dictionary) to the categories and determine any unusually high correlations between terms and categories.

If visualizing the documents or snippets of a category in a vector space, in one embodiment, the primary representation of each category is the centroid of the category. The distance metric employed to compare documents or snippets to each other and to the category centroids is the cosine similarity metric, as shown in equation 3:

$$\text{similarity} = \cos(\theta) = \frac{A \cdot B}{\|A\|\|B\|}. \tag{3}$$

In one embodiment, when analyzing distance, documents or snippets are not required to belong to the category of its nearest centroid or required to belong to only one category.

In addition, summarization may help in understanding what a category contains without having to analyze all of the documents or snippets in a category. In one embodiment, the summarization module 107 of the system 100 creates a feature bar chart to help explain what a category contains. The chart has an entry for every dictionary term (feature) that occurs in any document of the category. Each entry consists of two bars, a first bar to indicate what percentage of the documents in the category contain the feature and a second bar to indicate how frequently the feature occurs in the background population of documents from which the category was drawn. The bars are sorted in decreasing order of the difference between first and second bars such that the most important features of a category are shown at the beginning of the chart. Hence, the chart quickly summarizes the important features of a category, with the feature's relative importance indicated by the size of its bars. In other embodiments, the summarization module 107 may create other visualization tools, such as pie charts, scatter plots, graphs, etc.

In one embodiment, the module 107 may also sort documents based on the "Most Typical" first or "Least Typical" first criteria. In vector space terms, the module 107 sorts in the order of distance from the category centroid (i.e., most typical is closest to centroid, least typical is furthest from centroid). Reading documents in most typical order may help a user quickly understand what the category is generally about without having to read all documents in the category. Reading the least typical documents can help the user understand the scope of the category and if there is conceptual purity (i.e., do documents exist in the category that should not be related to the category).

In one embodiment, the summarization module 107 may also help determine Category to Category co-occurrences and Dictionary to Category co-occurrences, as described below.

Category/Category Co-Occurrence

In summarizing the categories, the summarization module 107 may create a Category to Category co-occurrence to compare different taxonomies to discover where an unusually high degree of association might reside. In one embodiment, such relationships are visualized via a co-occurrence table (cotable), which shows how the data breaks down across all the combinations of categories in two different taxonomies.

FIG. 7 illustrates an example keywords category vs sentiment category cotable 700. The challenge with cotables is determining which numbers are interesting. For example, the cell value for Miscellaneous/neutral in cotable 700 is large (490), thus inferring a possibly important relationship. But, the cell also corresponds to the largest category in the taxonomy. Thus, it should be determined if the number in the cell is more than would have been expected instead of relying on the pure size of numbers in the cells.

In one embodiment, the summarization module 107 determines mathematically if the number is approximately what is expected. Assuming no relationship exists that ties a particular sentiment to particular brand, it is expected to find an expected value E approximately equal to X*Y in a cell for a given sentiment and brand, where X is the percentage of times a given sentiment occurs and Y is the percentage of times the brand occurs. An exceptional value is something greater than E, indicating an association stronger than expected. E is different for every cell in the cotable, since the number of snippets for each sentiment and brand differs.

Furthermore, the module 107 may get a relative significance for different values in the cotable, such as distinguishing whether a 5 occurring in one cell is more interesting than a 10 occurring in a different cell, by using the Chi-Squared test—a statistical test that calculates the likelihood of seeing any particular value in the cell of a cotable. The smaller this probability, the less likely the value, the more interesting it is from a data mining perspective. When a very low probability value occurs in a cell, it suggests that the original assumption about no relationship existing between the taxonomies was incorrect. A correlation does not signify a definitive relationship between categories, but it may help reveal a relationship by indicating an area for further investigation. In one embodiment, the module 107 may shade the cells of the cotable according to show calculated probabilities for the values in the cells.

Dictionary/Category Co-Occurrence

The module 107 analyzes another type of co-occurrence called Dictionary to Category Co-occurrence by comparing a taxonomy of snippets or documents to the dictionary of words created during text clustering by the text clustering module 102. In one embodiment, a Dictionary to Category cotable contains the columns of taxonomy categories and the rows of dictionary terms, sorted in alphabetical order. FIG. 8 illustrates an example Dictionary to Category cotable 800. As previously described, categories may include time, keywords, and sentiment. By sorting for significance against one of the taxonomy classes (e.g., the highlighted cells of cotable 800), a plurality of business questions may be answered, including:

1. What issues are emerging as important relatively recently in the data (time vs. dictionary)?
2. What issues are associated with a particular company or brand (keyword vs dictionary)?
3. What issues are driving negative/positive opinions for a given brand (sentiment vs. dictionary)?

Text clustering may reveal significantly large topics and themes driving opinion on the web, but it may miss smaller, less prevalent issues that arise only for a particular brand or in a small window of time. Thus, Dictionary co-occurrence fills in such a gap.

Exemplary Computer Architecture for Implementation of Systems and Methods

Figure 9:
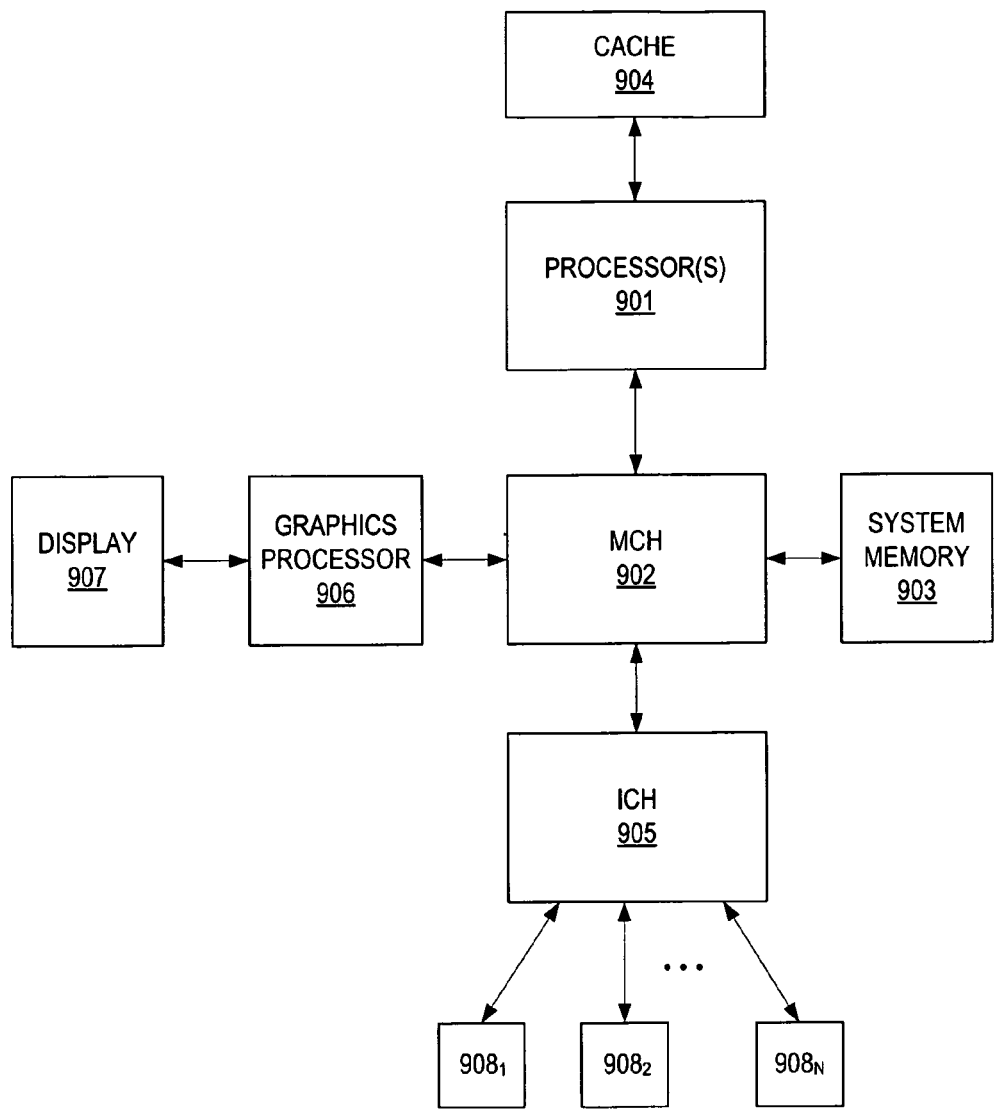
FIG. 9 illustrates an example computer architecture for implementing a system and methods as described in FIGS. 1-6 and the below detailed description.

FIG. 9 illustrates an example computer architecture for implementing a system and methods as described in FIGS. 1-6 and in the above disclosure. The exemplary computing system of FIG. 9 includes: 1) one or more processors 901; 2) a memory control hub (MCH) 902; 3) a system memory 903 (of which different types exist such as DDR RAM, EDO RAM, etc,); 4) a cache 904; 5) an I/O control hub (ICH) 905; 6) a graphics processor 906; 7) a display/screen 907 (of which different types exist such as Cathode Ray Tube (CRT), Thin Film Transistor (TFT), Liquid Crystal Display (LCD), DPL, etc.); and/or 8) one or more I/O devices 908.

The one or more processors 901 execute instructions in order to perform whatever software routines the computing system implements. The instructions frequently involve some sort of operation performed upon data. Both data and instructions are stored in system memory 903 and cache 904. Cache 904 is typically designed to have shorter latency times than system memory 903. For example, cache 904 might be integrated onto the same silicon chip(s) as the processor(s) and/or constructed with faster SRAM cells whilst system memory 903 might be constructed with slower DRAM cells. By tending to store more frequently used instructions and data in the cache 904 as opposed to the system memory 903, the overall performance efficiency of the computing system improves.

System memory 903 is deliberately made available to other components within the computing system. For example, the data received from various interfaces to the computing system (e.g., keyboard and mouse, printer port, LAN port, modem port, etc.) or retrieved from an internal storage element of the computing system (e.g., hard disk drive) are often temporarily queued into system memory 903 prior to their being operated upon by the one or more processor(s) 901 in the implementation of a software program. Similarly, data that a software program determines should be sent from the computing system to an outside entity through one of the computing system interfaces, or stored into an internal storage element, is often temporarily queued in system memory 903 prior to its being transmitted or stored.

The ICH 905 is responsible for ensuring that such data is properly passed between the system memory 903 and its appropriate corresponding computing system interface (and internal storage device if the computing system is so designed). The MCH 902 is responsible for managing the various contending requests for system memory 903 access amongst the processor(s) 901, interfaces and internal storage elements that may proximately arise in time with respect to one another.

One or more I/O devices 908 are also implemented in a typical computing system. I/O devices generally are responsible for transferring data to and/or from the computing system (e.g., a networking adapter); or, for large scale non-volatile storage within the computing system (e.g., hard disk drive). ICH 905 has bi-directional point-to-point links between itself and the observed I/O devices 908.

Referring back to FIG. 1, modules of the different embodiments of the described system may include software, hardware, firmware, or any combination thereof. The modules may be software programs available to the public or special or general purpose processors running proprietary or public software. The software may also be specialized programs written specifically for signature creation and organization and recompilation management. For example, storage of the system may include, but is not limited to, hardware (such as floppy diskettes, optical disks, CD-ROMs, and magneto-optical disks, ROMs, RAMs, EPROMs, EEPROMs, flash, magnetic or optical cards, propagation media or other type of media/machine-readable medium), software (such as instructions to require storage of information on a hardware storage unit, or any combination thereof.

In addition, elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, flash, magnetic or optical cards, propagation media or other type of media/machine-readable medium suitable for storing electronic instructions.

For the exemplary methods illustrated in FIGS. 2-6, embodiments of the invention may include the various processes as set forth above. The processes may be embodied in machine-executable instructions which cause a general-purpose or special-purpose processor to perform certain steps. Alternatively, these processes may be performed by specific hardware components that contain hardwired logic for performing the processes, or by any combination of programmed computer components and custom hardware components.

Embodiments of the invention do not require all of the various processes presented, and it may be conceived by one skilled in the art as to how to practice the embodiments of the invention without specific processes presented or with extra processes not presented.

General

The foregoing description of the embodiments has been presented only for the purpose of illustration and description and is not intended to be exhaustive or to limit the disclosure to the precise forms disclosed. Numerous modifications and adaptations are apparent to those skilled in the art without departing from the spirit and scope of the invention.

What is claimed is:

1. A computer-implemented method for systematically analyzing an electronic text, comprising:
    receiving by a computer the electronic text from a plurality of sources;
    determining an at least one term of interest to be identified in the electronic text;
    determining an at least one term of interest to be identified in the electronic text;
    identifying by the computer a plurality of locations within the electronic text including the at least one term of interest;
    for each location within a plurality of locations, creating by the computer a snippet from a text segment around the at least one term of interest at the location within the electronic text;
    creating by the computer multiple taxonomies for the at least one term of interest from the snippets, wherein the taxonomies include an at least one category, the at least one category including a sentiment based taxonomy; and
    determining by the computer associations between categories of a different taxonomies of the multiple taxonomies by determining:
    co-occurrences between the multiple taxonomies; and
    significance of co-occurrences between the multiple taxonomies,
    wherein the determining the co-occurrences further comprises:
        determining co-occurrences between a category of a single taxonomy and the at least one term of interest to determine significance of the at least one term of interest; and sorting the at least one term of interest by significance; and
    wherein at least one of the taxonomies is a time based taxonomy that is based on the creation date of the electronic text, the time based taxonomy generated by:
        crawling sources of electronic text to extract the creation dates;
        attaching an extracted creation date to a respective snippet to generate a dated snippet; and
        organizing the dated snippets into chronologically contiguous categories,
    wherein the sentiment based taxonomy is determined by:
        creating a list of positive, negative and neutral terms indicative of different sentiments, respectively;
        determining the level of sentiment corresponding to the at least one term generated from a respective snippet based on an assigned value;
        normalizing the values to generate at least one term having a sentiment score corresponding thereto, the sentiment score including at least one of a positive sentiment score and a negative sentiment score; and
        sorting snippets of the electronic text based on a calculated sentiment score differential between the at least one positive sentiment score and the at least one negative sentiment score.

2. The computer-implemented method of claim 1, further comprising sending the sorted at least one term of interest for user review.

3. The computer-implemented method of claim 1, wherein each taxonomy of the multiple taxonomies is one of the group consisting of:
    a text clustering based taxonomy,
    a taxonomy created from the occurrence of terms of interest.

4. The computer-implemented method of claim 3, further comprising:
    creating from the categories of the electronic text a plurality of category/term of interest statistics of importance; and determining from the electronic text within each category and the category/term of interest statistics the importance of each co-occurrence.

5. The computer-implemented method of claim 4, wherein the text clustering is configured to use a method based on selecting a cohesive terms of the electronic text to seed category selection, and wherein the at least one term having a sentiment score is categorized by:

identifying all terms having a positive sentiment score and summing all positive sentiment scores;
identifying all terms having a negative sentiment score and summing all negative sentiment scores; and
calculating a difference between the sum of the positive sentiment scores and the sum of the negative sentiment scores.

6. The computer-implemented method of claim 1, wherein the electronic text is web based.

7. A system for systematically analyzing an electronic text, comprising:
a receiver to receive the electronic text from a plurality of sources;
a processor coupled to the receiver to:
determine an at least one term of interest to be identified in the electronic text;
identify a plurality of locations within the electronic text including the at least one term of interest;
create for each location within a plurality of locations a snippet from a text segment around the at least one term of interest at the location within the electronic text;
create multiple taxonomies for the at least one term of interest from the snippets, wherein the taxonomies include an at least one category, the at least one category including a sentiment based taxonomy; and
determine between categories of a different taxonomies of the multiple taxonomies by determining:
co-occurrence between the multiple taxonomies;
wherein at least one of the taxonomies is a time based taxonomy that is based on the creation date of the electronic text, the time based taxonomy generated by:
crawling sources of electronic text to extract the creation dates;
attaching an extracted creation date to a respective snippet to generate a dated snippet; and
organizing the dated snippets into chronologically contiguous categories; and
a module in electrical communication with the processor, the module configured to determine co-occurrences for a single taxonomy against a term feature space to determine significance of the at least one term of interest; and
a module to sort the at least one term of interest by significance,
wherein the sentiment based taxonomy is determined by:
creating a list of positive, negative and neutral terms indicative of different sentiments, respectively;
determining the level of sentiment corresponding to the at least one term generated from a respective snippet based on an assigned value;
normalizing the values to generate at least one term having a sentiment score corresponding thereto, the sentiment score including at least one of a positive sentiment score and a negative sentiment score; and
sorting snippets of the electronic text based on a calculated sentiment score differential between the at least one positive sentiment score and the at least one negative sentiment score.

8. The system of claim 7, further comprising a module to send the sorted at least one term of interest for review.

9. The system of claim 7, wherein each taxonomy of the multiple taxonomies is one of the group consisting of:
a text clustering based taxonomy,
a taxonomy created from the occurrence of terms of interest.

10. The system of claim 7, further comprising: determining for the at least one term of interest categories of the electronic text in the taxonomies; creating from the categories of the electronic text a plurality of category/term of interest statistics of importance; and determining from the electronic text within each category and the category/term of interest statistics the importance of each category.

11. The system of claim 10, wherein the text clustering is configured to use a method based on selecting a cohesive terms of the electronic text to seed category selection, and wherein the at least one term having a sentiment score is categorized by:
identifying all terms having a positive sentiment score and summing all positive sentiment scores;
identifying all terms having a negative sentiment score and summing all negative sentiment scores; and
calculating a difference between the sum of the positive sentiment scores and the sum of the negative sentiment scores.

12. The system of claim 7, wherein the electronic text is web based.

13. A computer program product comprising a non-transitory computer useable storage medium to store a computer readable program, wherein the non-transitory computer readable program, when executed on a computer, causes the computer to perform operations comprising:
receiving the electronic text from a plurality of sources;
determining an at least one term of interest to be identified in the electronic text;
determining an at least one term of interest to be identified in the electronic text;
identifying a plurality of locations within the electronic text including the at least one term of interest;
for each location within a plurality of locations, creating by a snippet from a text segment around the at least one term of interest at the location within the electronic text;
creating multiple taxonomies for the at least one term of interest from the snippets, wherein the taxonomies include an at least one category, the at least one category including a sentiment based taxonomy; and
determining associations between categories of a different taxonomies of the multiple taxonomies by determining:
co-occurrences between the multiple taxonomies; and
significance of co-occurrences between the multiple taxonomies;
determining co-occurrences between a category of a single taxonomy and the at least one term of interest to determine significance of the at least one term of interest;
sorting the at least one term of interest by a respective significance; and
outputting the sorted at least one term of interest,
wherein at least one of the taxonomies is a time based taxonomy that is based on the creation date of the electronic text, the time based taxonomy generated by:
crawling sources of electronic text to extract the creation dates;
attaching an extracted creation date to a respective snippet to generate a dated snippet; and
organizing the dated snippets into chronologically contiguous categories,
wherein the sentiment based taxonomy is determined by:
creating a list of positive, negative and neutral terms indicative of different sentiments, respectively;
determining the level of sentiment corresponding to the at least one term generated from a respective snippet based on an assigned value;
normalizing the values to generate at least one term having a sentiment score corresponding thereto, the sentiment score including at least one of a positive sentiment score and a negative sentiment score; and sorting snippets of the electronic text based on a calculated sentiment score differential between the at least one positive sentiment score and the at least one negative sentiment score.

14. The computer program product of claim 13, wherein each taxonomy of the multiple taxonomies is one of the group consisting of:
   a text clustering based taxonomy,
   a taxonomy created from the occurrence of terms of interest.

15. The computer program product of claim 14, wherein the text clustering is configured to use a method based on selecting a cohesive terms of the electronic text to seed category selection, and wherein the at least one term having a sentiment score is categorized by:
   identifying all terms having a positive sentiment score and summing all positive sentiment scores;
   identifying all terms having a negative sentiment score and summing all negative sentiment scores; and
   calculating a difference between the sum of the positive sentiment scores and the sum of the negative sentiment scores.

16. The computer program product of claim 13, wherein the electronic text is web based.

* * * * *